S. GULBRANDSEN.

LIMP INCANDESCENT MANTLE.

APPLICATION FILED DEC. 1, 1916.

Reissued Jan. 2, 1917.

14,242.

WITNESSES

H. M. Conin

R. A. Balderson

INVENTOR

S. Gulbrandsen by Bakewell, Byrnes, Parmelee & Allen

THE NORRIS PETERS CO. PHOTO-LITHO., WASHINGTON, D. C.

UNITED STATES PATENT OFFICE.

SVERRE GULBRANDSEN, OF WOODBURY, NEW JERSEY, ASSIGNOR TO WELSBACH LIGHT COMPANY, OF GLOUCESTER CITY, NEW JERSEY, A CORPORATION OF NEW JERSEY.

LIMP INCANDESCENT MANTLE.

14,242. Specification of Reissued Letters Patent. Reissued Jan. 2, 1917.

Original No. 1,197,365, dated September 5, 1916, Serial No. 75,047, filed January 29, 1916. Application for reissue filed December 1, 1916. Serial No. 134,538.

*To all whom it may concern:*

Be it known that I, SVERRE GULBRANDSEN, a citizen of the United States, residing at Woodbury, in the county of Gloucester and State of New Jersey, have invented a new and useful Improvement in Limp Incandescent Mantles, of which the following is a full, clear, and exact description, reference being had to the accompanying drawings, forming part of this specification, in which—

Figure 1:
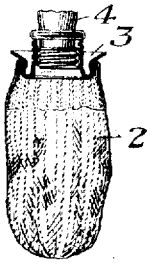
Figure 2:
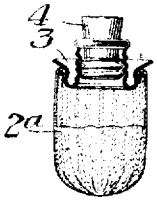

Figure 1 is a side elevation partly in section showing an inverted limp mantle made in accordance with my invention in position prior to ignition and use, and Fig. 2 is a similar view showing the mantle after shaping, under actual burning use.

Previous to my invention set forth in my Patent No. 1,133,470, dated March 30, 1915, inverted gas mantles used for ordinary city pressures (2″ to 8″ water column) were of the ventilated type; that is, there was an annular opening at the top of the mantle between the burner nozzle and the ring carrying the mantle, through which the products of combustion were vented. Closed-top mantles, that is, mantles whose carriers or rings made a tight joint with the burner nozzle, were confined to use on high pressure systems.

In accordance with my patent above referred to, I discovered that a small diameter closed-top limp mantle could be properly shaped and hardened under city pressures; and this discovery has led to a wide-spread commercial use of the limp or rag mantles or burners using ordinary city pressure.

In addition to the discovery as to limiting diameters set forth in said patent, I have discovered that the relation between the length and diameter of these inverted mantles having carriers adapted to make a tight joint with the burner nozzle is of great importance and has a direct relation to the efficiency of such mantles.

In the closed-top mantles previously used for high pressure lighting, the proportion of length to width was relatively large; that is, the mantle was long in proportion to its diameter. I have discovered that in order to give proper commercial efficiency to inverted closed-top mantles used on city pressures, the length must be considerably less in proportion to the diameter. In speaking of this relationship, I am referring to the relation of these dimensions after shaping and hardening in place on the burner; and I am also referring to the dimensions of the illuminated portion of the mantle below the carrier or the ring. In high pressure systems, relatively long closed-top mantles were used because it was found practicable to brightly incandesce the whole mantle surface. This is not the case when such long mantles are used for ordinary city pressures.

I have discovered that the reasons for these facts are as follows: The gas burned in such inverted closed-top mantles receives part of the air necessary for combustion through the air inlets to the Bunsen tube or mixing chamber; this is termed the primary air. In addition to this, the burning mixture also obtains a supply of secondary air around and exterior to the mantle to complete or support the combustion. However, the supply of secondary air is more or less contaminated by the rising products of combustion. This stream of products spreads out as it rises and makes it increasingly difficult for the flame at the intermediate and upper portions of the mantle to obtain an adequate supply of oxygen at or near the mantle surface. The more contaminated with products the space around the mantle becomes, the farther away from the mantle surface the flame has to travel before obtaining an adequate supply of secondary air. Also the farther the flame travels away from the mantle surface, the less bright is the illumination of this surface.

In high pressure systems, the high velocity of the gas issuing from the gas jet results in the entrainment of a relatively large proportion of primary air, thus reducing the proportion of secondary air required to complete the combustion at the mantle surface. Being thus more independent of the supply of secondary air, it has been customary to use long narrow shapes for such closed-top mantles on high pressure systems. In this way a greater lighting surface and a higher candlepower were obtained, together with high efficiency. The rising stream of products was not enough of a factor to cause any noticeable loss of illumination of the upper part of the mantle.

If it were attempted to use closed-up mantles of such long shape for low pressure lighting, it would be found that the illumination would be unsatisfactory, this being especially noticeable on the intermediate and upper portions of the mantle. In this case the proportion of primary air entrained by the gas issuing from the jet is much lower in comparison because of the well known fact that in any injector, the proportion of fluid entrained by the injector increases as the velocity of the jet increases. Therefore a larger proportion of secondary air is needed and it is correspondingly important to deliver this secondary air to the mantle surface in an uncontaminated condition. It is impossible however to accomplish this in a mantle of the usual long shape. Therefore, in the use of inverted limp or rag mantles with closed-top on city pressures, I have found it is necessary to limit the length of the mantle in proportion to its diameter to much less than that used on limp mantles for high pressure systems in order to give the proper illumination to the upper portion of the mantle. By thus limiting the length, while the primary air is proportionately less, the rising stream of products will be smaller in volume and will be closer to the upper portion of the mantle than they were in longer mantles, and hence the upper portions will be properly illuminated.

By long experimenting, I have found that the proportion of length to diameter in closed-top limp or rag mantles for city pressures must be less than 2, and is preferably 1.6. I also prefer to use the diameter set forth in my Patent No. 1,133,470; namely, a mantle less than an inch in diameter when shaped and hardened; and therefore a mantle when shaped and hardened in place is not over 2 inches in length for a 1 inch diameter. In actual practice, I find the highest efficiency is given when the diameter of the shaped and hardened mantle is about ⅞ inch with a length of about ⅞ inch. I have also found that with this proportion of length, the limp mantle will shape better under burning conditions and thus give better illuminating power.

I have further discovered, that in these closed-top limp mantles for city pressure, the weight of mantle material per square inch is an important factor in giving high efficiency to these limp or rag mantles for city pressures.

Closed-top limp mantles heretofore used on high pressures have been relatively heavy, weighing about .070 grams per square inch. It was possible to illuminate such mantles successfully on account of the high flame temperature obtained with the high pressure gas. I have found, however, that such heavy limp closed-top mantles cannot be used practicably with city pressures, as the incandescence would not be commercially satisfactory.

In a long series of experiments, I have found that the greatest illuminating power for such mantles is obtained with a weight of about .040 to .045 grams per square inch, and that the weight should be less than .055 grams per square inch. In speaking of the weight per square inch, I refer throughout to the weight of the illuminated portion of the shaped and hardened mantle.

In the drawings, Figure 1 shows a limp mantle constructed in accordance with my invention and having a screw-carrier ring 3 adapted to screw on a burner nozzle 4 with a tight closure. In Fig. 2, I show the mantle $2^a$ after shaping and hardening in place.

The advantages of my invention will be apparent to those skilled in the art, since the lighting power and efficiency of closed-top inverted limp mantles for city pressures are greatly increased.

Variations may be made in the material used for the mantle, the particular type of the carrier or ring used for making a tight closure with the burner nozzle, etc., without departing from my invention.

I claim:

1. As a new article of manufacture, a limp inverted mantle having a carrier adapted for close connection with a burner using ordinary gas pressures, said mantle being of a size to shrink to less than 1 inch diameter when shaped in place, and having such a proportion of length to diameter that when shaped the proportion will be not over 2; substantially as described.

2. As a new article of manufacture, a limp inverted mantle having its open end portion adapted to be tightly secured to a reduced burner tip using ordinary city gas pressures, said mantle having its surface area not less than five times its volume when shaped, and having a proportion of length to diameter such that when shaped this proportion will not be over 2; substantially as described.

3. As a new article of manufacture, a limp inverted mantle secured to a carrier adapted for connection to a burner nozzle using ordinary gas pressures, said mantle being of a size to shrink to at least one inch diameter when shaped in place, the proportion of the length of the mantle to its diameter being such that when shaped this proportion will not be over 2, and the weight of the mantle per square inch of area when shaped being not over .055 grams; substantially as described.

4. As a new article of manufacture, a limp inverted mantle adapted to be tightly secured to a reduced burner tip using ordinary city gas pressures, said mantle having its surface area not less than five times its volume when shaped, and the weight of the shaped mantle being not over .055 grams per square inch; substantially as described.

5. As a new article of manufacture, a limp inverted mantle having a carrier adapted to make a close connection with a burner nozzle using ordinary gas pressures, said mantle being of a size to shrink to at least one inch diameter when shaped in place and being of such weight that after shaping in place its weight per square inch of illuminated portion is not over .055 grams, substantially as described.

In testimony whereof I have hereunto set my hand this 27th day of November, 1916.

SVERRE GULBRANDSEN.

Witnesses:

THOS. K. LANCASTER,

J. H. JOHNSON.

Copies of this patent may be obtained for five cents each, by addressing the "Commissioner of Patents, Washington, D. C."

Correction in Reissue Letters Patent No. 14,242.

It is hereby certified that in Reissue Letters Patent No. 14,242, granted January 2, 1917, upon the application of Sverre Gulbrandsen, of Woodbury, New Jersey, for an improvement in "Limp Incandescent Mantles," an error appears in the printed specification requiring correction as follows: Page 1, line 36, for the word "or," second occurrence, read *on;* and that the said Letters Patent should be read with this correction therein that the same may conform to the record of the case in the Patent Office.

Signed and sealed this 30th day of January, A. D., 1917.

[SEAL.]

F. W. H. CLAY,
*Acting Commissioner of Patents.*

Cl. 67—98.